(12) United States Patent
Hsu

(10) Patent No.: US 10,464,304 B2
(45) Date of Patent: Nov. 5, 2019

(54) THREE-DIMENSIONAL PRINTING APPARATUS

(71) Applicants: XYZprinting, Inc., New Taipei (TW); Kinpo Electronics, Inc., New Taipei (TW)

(72) Inventor: Che-Ming Hsu, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 471 days.

(21) Appl. No.: 15/464,364

(22) Filed: Mar. 21, 2017

(65) Prior Publication Data

US 2018/0222126 A1     Aug. 9, 2018

(30) Foreign Application Priority Data

Feb. 9, 2017  (CN) .......................... 2017 1 0070767

(51) Int. Cl.
| | |
|---|---|
| *B29C 64/35* | (2017.01) |
| *B33Y 50/02* | (2015.01) |
| *B33Y 30/00* | (2015.01) |
| *B33Y 40/00* | (2015.01) |

(52) U.S. Cl.
CPC ............... *B33Y 50/02* (2014.12); *B33Y 30/00* (2014.12); *B33Y 40/00* (2014.12)

(58) Field of Classification Search
CPC ......... B33Y 50/02; B33Y 30/00; B33Y 40/00; B29C 64/112; B29C 64/386; B29C 64/35; B29C 64/205
See application file for complete search history.

(56) References Cited

U.S. PATENT DOCUMENTS

| | | | |
|---|---|---|---|
| 6,305,769 B1 | 10/2001 | Thayer et al. | |
| 2002/0195747 A1* | 12/2002 | Hull | B29C 41/12 264/401 |
| 2005/0104241 A1 | 5/2005 | Kritchman et al. | |
| 2007/0063366 A1* | 3/2007 | Cunningham | B29C 64/40 264/37.1 |

FOREIGN PATENT DOCUMENTS

| | | |
|---|---|---|
| WO | 2015049834 | 4/2015 |
| WO | 2017009832 | 1/2017 |

OTHER PUBLICATIONS

"Office Action of Japan Counterpart Application", dated Jun. 17, 2019, pp. 1-3.

* cited by examiner

*Primary Examiner* — Joseph S Del Sole
*Assistant Examiner* — John Robitaille
(74) *Attorney, Agent, or Firm* — JCIPRNET

(57) ABSTRACT

A 3D printing apparatus including a forming assembly, a scraping tool, a first collection tank, a sweeping tool and a second collection tank is provided. A roller of the forming assembly is adhered with a forming material during a forming process. When the roller is rotated, the scraping tool removes the forming material adhered on the surface of the roller. The scraping tool is disposed between the first collection tank and the roller. The forming material removed from the surface of the roller is guided into the first collection tank. The sweeping tool is configured to sweep the forming material in the first collection tank to a position of the first collection tank. The second collection tank is connected to the position of the first collection tank to receive the forming material swept to the position by the sweeping tool.

16 Claims, 8 Drawing Sheets

THREE-DIMENSIONAL PRINTING APPARATUS

CROSS-REFERENCE TO RELATED APPLICATION

This application claims the priority benefit of China application serial no. 201710070767.5, filed on Feb. 9, 2017. The entirety of the above-mentioned patent application is hereby incorporated by reference herein and made a part of this specification.

BACKGROUND OF THE INVENTION

Field of the Invention

The invention relates to a three-dimensional (3D) printing apparatus, and particularly relates to a 3D printing apparatus having a sweeping tool.

Description of Related Art

Along with quick development of technology, different methods for constructing physical three-dimensional (3D) models by using an additive manufacturing technology such as layer-by-layer model construction, etc. have been provided. Generally, the additive manufacturing technology is to convert design data of the 3D model constructed by software such as computer aided design (CAD), etc. into a plurality of consecutively stacked thin (quasi-2D) cross-sectional layers.

Presently, a plurality of methods for forming the thin cross-sectional layers has been developed. For example, a 3D printer sprays a forming material on a forming platform through a spray nozzle, and then uses a roller to flatten the forming material on the forming platform. A scraping tool is disposed beside the roller, and removes the forming material on a surface of the roller for guiding to a collection tank. On the other hand, the 3D printer drives a light source to move along X-Y coordinates to irradiate the forming material on the forming platform according to X-Y-Z coordinates constructed according to the design data of the 3D model, so as to cure the forming material to form a correct shape of the cross-section layer. Therefore, a 3D object is formed after the above steps are repeatedly executed.

However, during the process of forming the 3D object, when the scraping tool scrapes the forming material adhered on the roller, the forming material is guided into the collection tank along a surface of the scraping tool. However, a part of the forming material in the collection tank is cured along with time, and a part of the forming material presents a liquid state (which is referred as a semi-solid state). The forming material in the semi-solid state has low mobility, and is liable to be piled up in the collection tank. When the scraping tool continually scraps the forming material on the roller, the newly scraped forming material is difficult to be guided into the collection tank, and is liable to be piled up between the roller and the scraping tool. Therefore, the effect that the scraping tool scraps the forming material adhered on the roller is decreased, and the effect that the roller flattens the forming material on the forming platform is accordingly aggravated, which causes poor printing quality.

SUMMARY OF THE INVENTION

The invention is directed to a three-dimensional (3D) printing apparatus, which is adapted to conveniently clean a forming material to achieve good printing quality.

An embodiment of the invention provides a 3D printing apparatus including a forming assembly, a scraping tool, a first collection tank, a sweeping tool and a second collection tank. The forming assembly has a roller. The forming assembly is configured to produce and stack a forming material to form a 3D object during a forming process. A surface of the roller is adhered with the forming material during the forming process. The scraping tool is disposed beside the roller and is attached to the surface of the roller. When the roller is rotated, the scraping tool removes the forming material adhered on the surface of the roller. The scraping tool is disposed between the first collection tank and the roller. The forming material removed from the surface of the roller is guided into the first collection tank. The sweeping tool is movably disposed on the scraping tool and the first collection tank. The sweeping tool is configured to sweep the forming material in the first collection tank to a position of the first collection tank. The second collection tank is connected to the position of the first collection tank to receive the forming material swept to the position by the sweeping tool.

According to the above description, in the 3D printing apparatus according to the embodiment of the invention based on the configuration of the sweeping tool, the scraping tool, the first collection tank and the second collection tank, during the forming process, the forming material on surface of the roller is scraped by the scraping tool and is guided to the first collection tank, and the sweeping tool is configured to sweep the forming material in the first collection tank to a position of the first collection tank, and the second collection tank receives the forming material swept to the position by the sweeping tool. Therefore, the 3D printing apparatus of the invention is capable of conveniently clean the forming material. Moreover, a chance that the forming material is piled up between the roller and the scraping tool is greatly decreased, so as to maintain the effect that the roller flattens the forming material on the forming platform, and the 3D printing apparatus of the invention has good printing quality.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
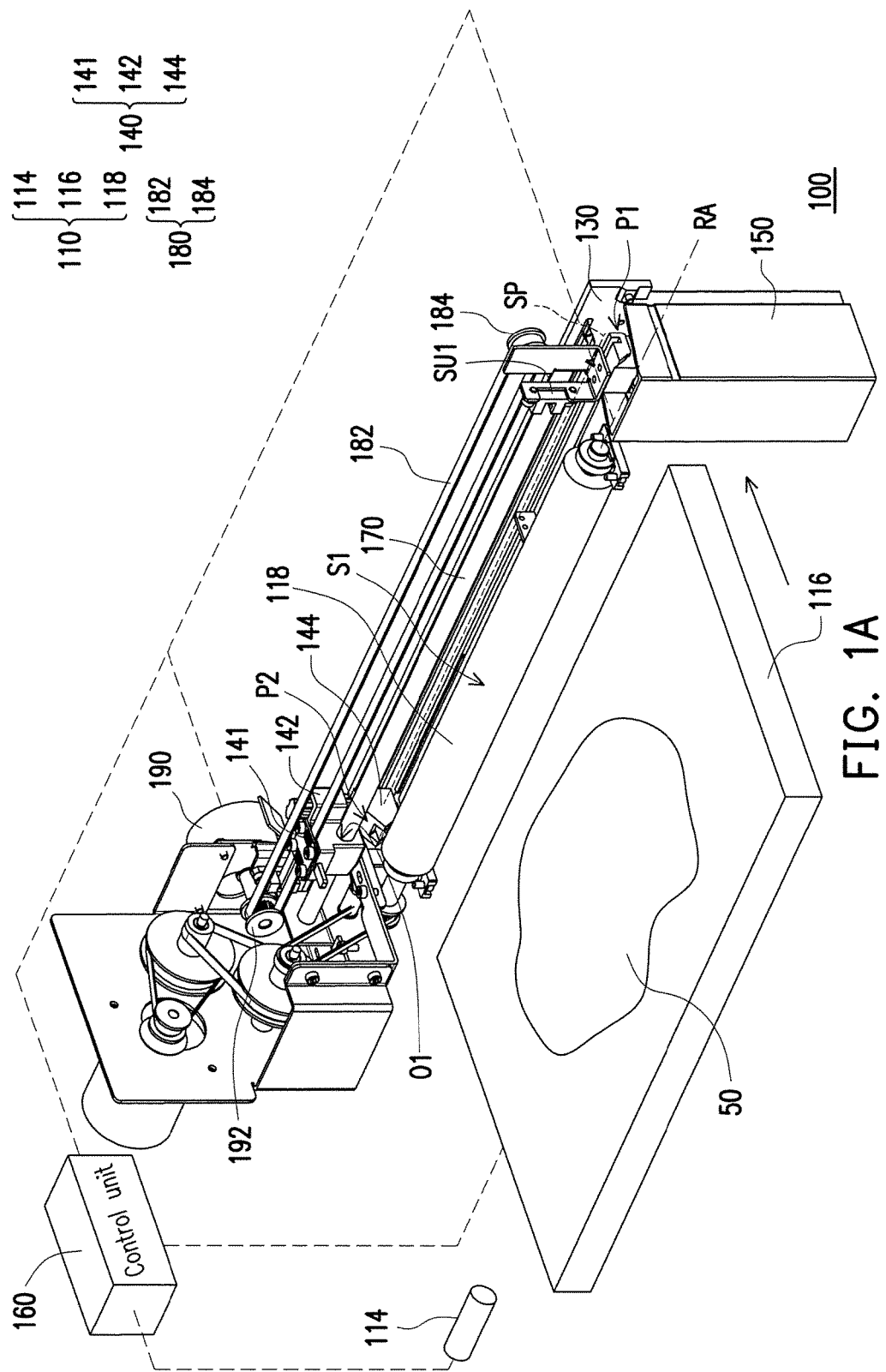
FIG. 1A, FIG. 1B and FIG. 1E are schematic diagrams of a three-dimensional (3D) printing apparatus in different time points according to an embodiment of the invention.
Figure 1B:
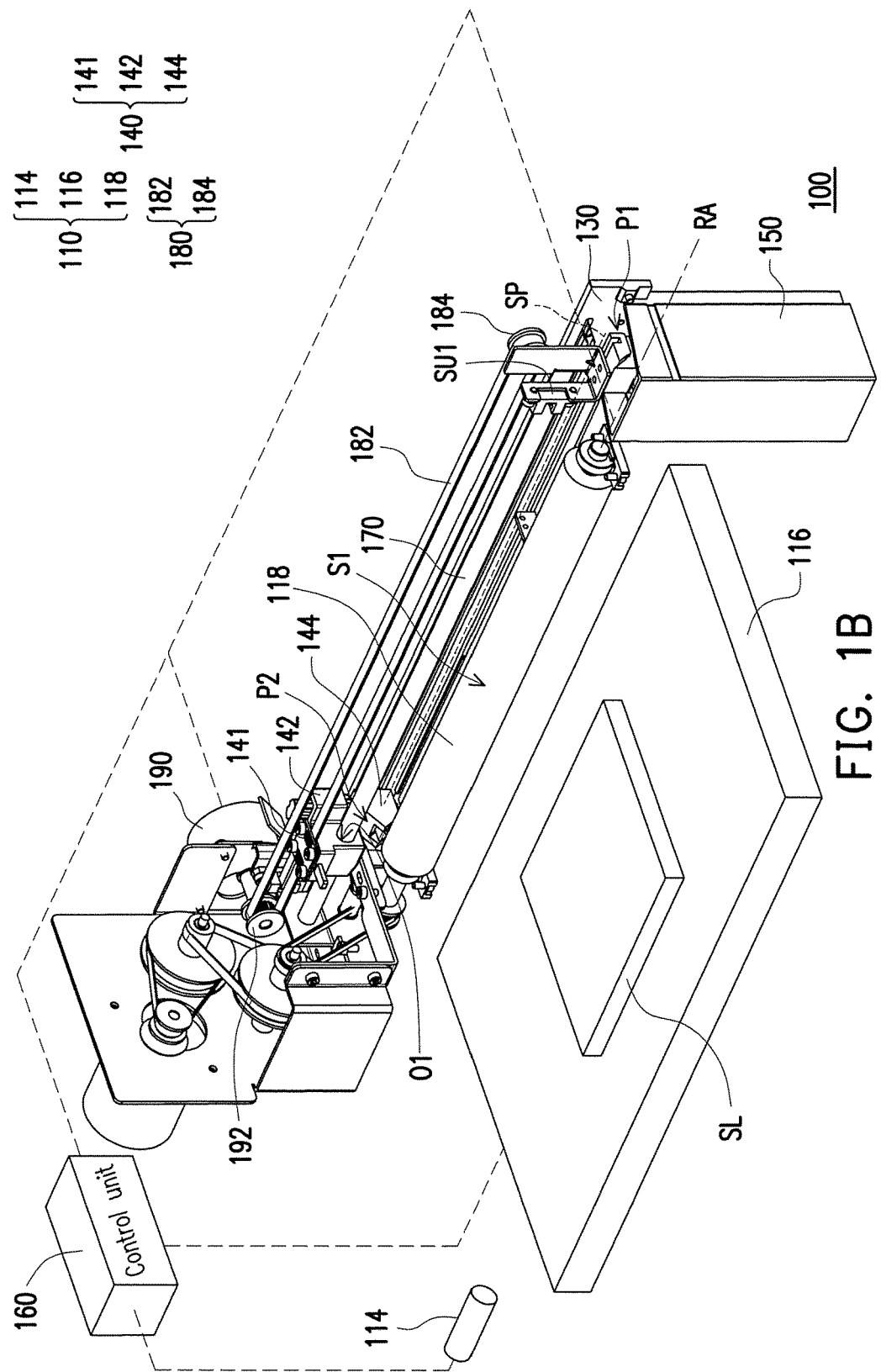
Figure 1C:
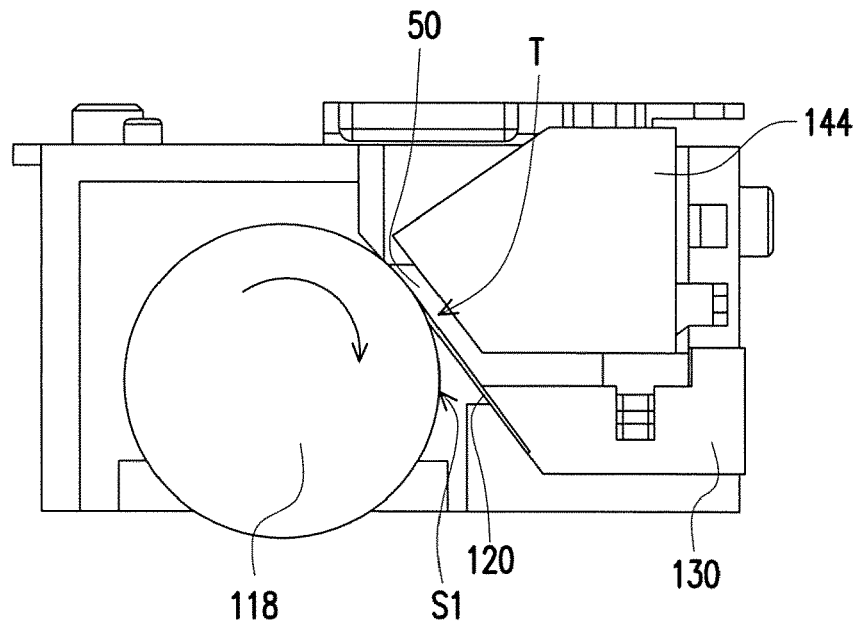
FIG. 1C is a cross-sectional and enlarged view of the 3D printing apparatus of FIG. 1B at a position P2 when a roller is rotated.
Figure 1D:
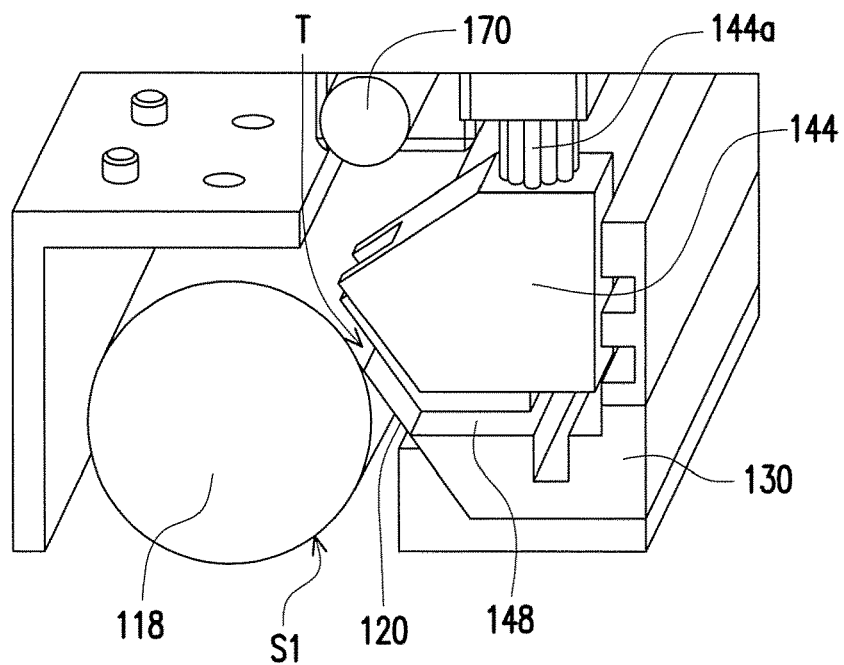
FIG. 1D is an oblique view of the 3D printing apparatus of FIG. 1B at the position P2.
Figure 1E:
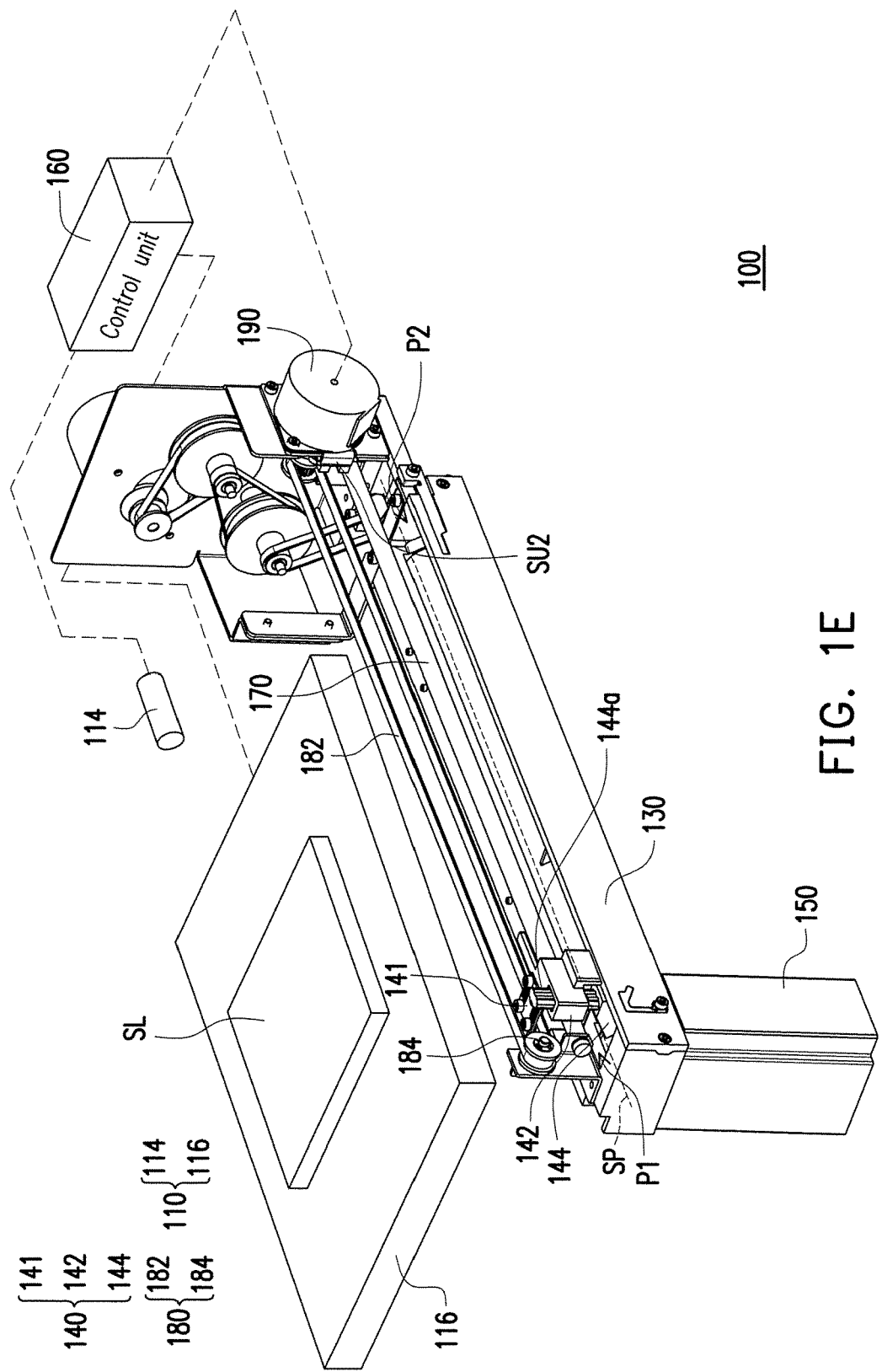

FIG. 1A, FIG. 1B and FIG. 1E are schematic diagrams of a three-dimensional (3D) printing apparatus in different time points according to an embodiment of the invention. FIG. 1C is a cross-sectional and enlarged view of the 3D printing apparatus of FIG. 1B at a position P2 when a roller is rotated. FIG. 1D is an oblique view of the 3D printing apparatus of FIG. 1B at the position P2.

Referring to FIG. 1A to FIG. 1E, in the present embodiment, the 3D printing apparatus 100 includes a forming assembly 110, a scraping tool 120 (for example, a scrapper shown in FIG. 1C and FIG. 1D), a first collection tank 130, a sweeping tool 140 and a second collection tank 150. The forming assembly 110 has a roller 118. The scraping tool 120 is disposed beside the roller 118 and is attached to a surface S1 of the roller 118. The scraping tool 120 is disposed between the first collection tank 130 and the roller 118 (as shown in FIG. 1C and FIG. 1D). The sweeping tool 140 is movably disposed on the scraping tool 120 and the first collection tank 130. The second collection tank 150 is connected to the first collection tank 130 at a position P1. The forming assembly 110 is configured to produce and stack a forming material 50 during a forming process (i.e. a process of forming a 3D object) to form the 3D object. The process that the 3D printing apparatus 100 forms the 3D object is described in detail below.

Referring to FIG. 1A, in detail, the 3D printing apparatus 100 further includes a control unit 160, and the control unit 160 is, for example, a controller. The control unit 160 is electrically connected to the forming assembly 110 and the sweeping tool 140. Besides the roller 118, the forming assembly 110 further includes a spray nozzle (not shown), a curing tool 114 and a forming platform 116. The spray nozzle contains the forming material 50, and the forming material 50 is, for example, a photosensitive material, and is, for example, heated and melted by a heater located at the spray nozzle, and is sprayed on the forming platform 116 by the spray nozzle. The curing tool 114 is, for example, a curing light source, and the curing light source is controlled by the control unit 160 to send an ultraviolet light to cure the forming material 50 on the forming platform 116. The control unit 160 controls the spray nozzle in the forming assembly 110 according to forming information, and the spray nozzle sprays the forming material 50 on the forming platform 116, and the curing tool 114 cures and stacks the forming material 50 layer-by-layer to form a 3D object on the forming platform 116. The forming information is, for example, constructed by a computer host through computer-aided design (CAD) or animation modelling software, etc., which is not limited by the invention. The control unit 160 is configured to read and process the forming information, and drive the forming assembly 110 to print the 3D object layer-by-layer.

Referring to FIG. 1B, the control unit 160 controls the roller 118 to rotate, and drives the forming platform 116 to move towards the roller 118. When the forming platform 116 is moved towards the roller 118, the forming material 50 on the forming platform 116 is also moved towards the roller 118, such that the roller 118 may flatten the forming material 50 on the forming platform 116. After the forming material 50 is flattened, the control unit 160 controls the curing tool 114 to send the ultraviolet light to cure the forming material 50 on the forming platform 116, so as to form a solid layer SL. The 3D printing apparatus 100 executes the aforementioned procedure once or multiple times to form one or a plurality of solid layers SL to form the 3D object.

On the other hand, referring to FIG. 1C and FIG. 1D, a flow tunnel T is formed between the scraping tool 120 and the sweeping tool 140. The surface S1 of the roller 118 is adhered with the forming material 50 during the forming process, as the scraping tool 120 is attached to the roller 118, when the roller 118 is rotated, the scraping tool 120 may remove the forming material 50 adhered on the surface S1 of the roller 118, and the forming material 50 removed from the surface S1 of the roller 118 is guided to the first collection tank 130 along the flow tunnel T.

Referring to FIG. 1B, FIG. 1C and FIG. 1E, the sweeping tool 140 is configured to sweep the forming material 50 in the first collection tank 130 to a position P1 of the first collection tank 130. The second collection tank 150 is configured to receive the forming material 50 swept to the position P1 by the sweeping tool 140. To be specific, the first collection tank 130 has two positions P1 and P2 opposite to each other, and the two positions P1 and P2 are respectively located two opposite ends of the first collection tank 130. A sweeping path SP is defined between the position P2 of the first collection tank 130 and the position P1 of the first collection tank 130. The sweeping tool 140 moves along the sweeping path SP to sweep the forming material 50 in the first collection tank 130. A ration axis RA is parallel to the sweeping path SP.

Referring to FIG. 1A, FIG. 1B and FIG. 1E, in detail, the 3D printing apparatus 100 further includes a first guide post 170, a transmission assembly 180 and a motor 190. The sweeping tool 140 includes a fixing portion 141, a first moving member 142 and a second moving member 144. The sweeping tool 140 is movably disposed on the first guide post 170. An extending direction of the first guide post 170 is parallel to the sweeping path SP. The transmission assembly 180 is connected to the sweeping tool 140. The motor 190 is connected to the transmission assembly 180 and drives the transmission assembly 180 to drive the sweeping tool 140 to move along the sweeping path SP. The first moving member 142 and the second moving member 144 are movably disposed on the first guide post 170, and are connected to the transmission assembly 180. To be specific, the transmission assembly 180 further includes a belt 182 and a roller 184. The motor 190 is, for example, a stepping motor, and has a rotation shaft 192. The belt 182 surrounds the roller 184 and the rotation shaft 192. The fixing portion 141 of the sweeping tool 140 is fixed on the belt 182. Therefore, when the motor 190 is controlled to drive the rotation shaft 192 to rotate, the belt 182 is driven by the rotation shaft 192, and the sweeping tool 140 is driven by the belt 182 to move along the sweeping path SP parallel to the extending direction of the first guide post 170, i.e. the sweeping tool 140 sweeps along the first collection tank 130 from the position P2 to the position P1, so as to sweep the forming material 50 to the position P1, and the second collection tank 150 receives the forming material 50 swept to the position P1 by the sweeping tool 140.

Figure 2:
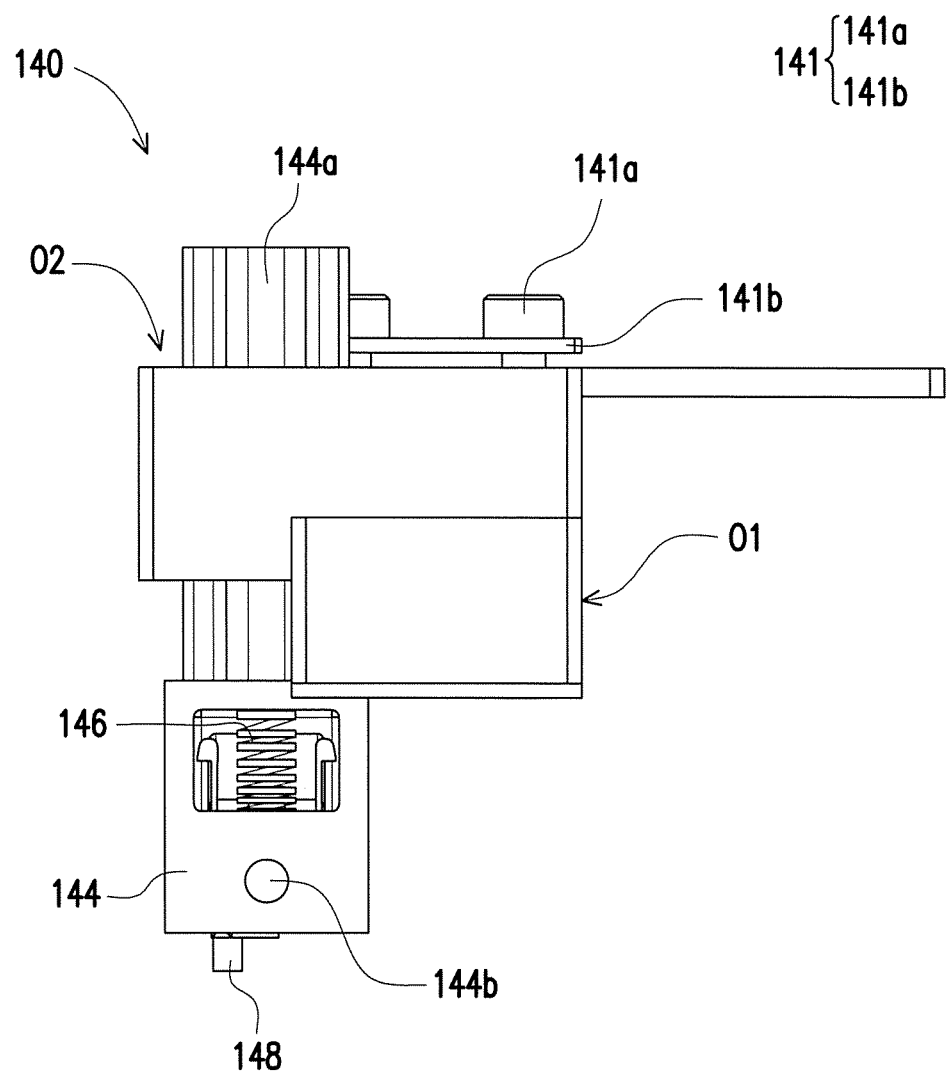
FIG. 2 is an enlarged view of a sweeping tool in the 3D printing apparatus of FIG. 1A to FIG. 1E.
Figure 3:
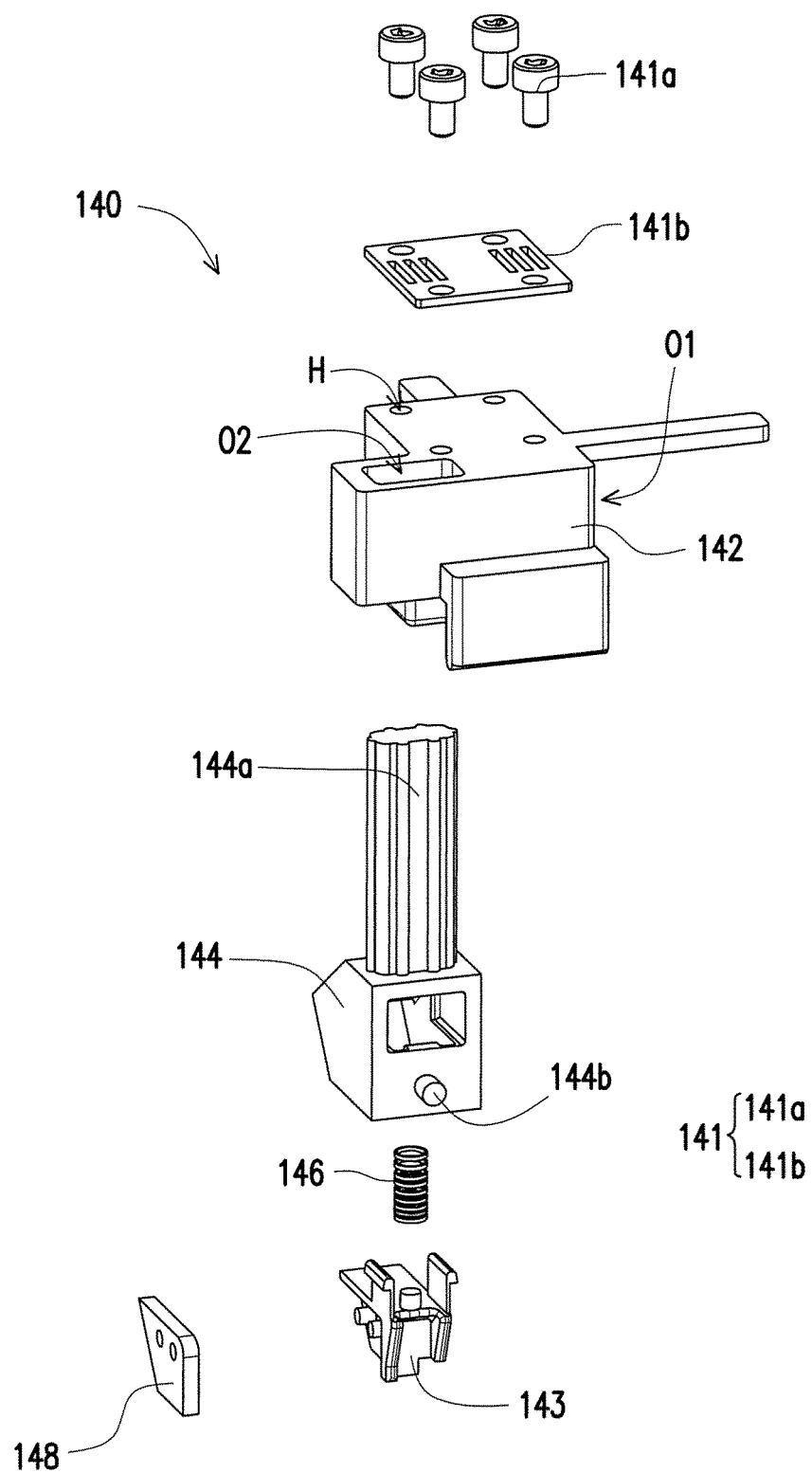
FIG. 3 is an exploded view of the sweeping tool in the 3D printing apparatus of FIG. 1A to FIG. 1E.
Figure 4:
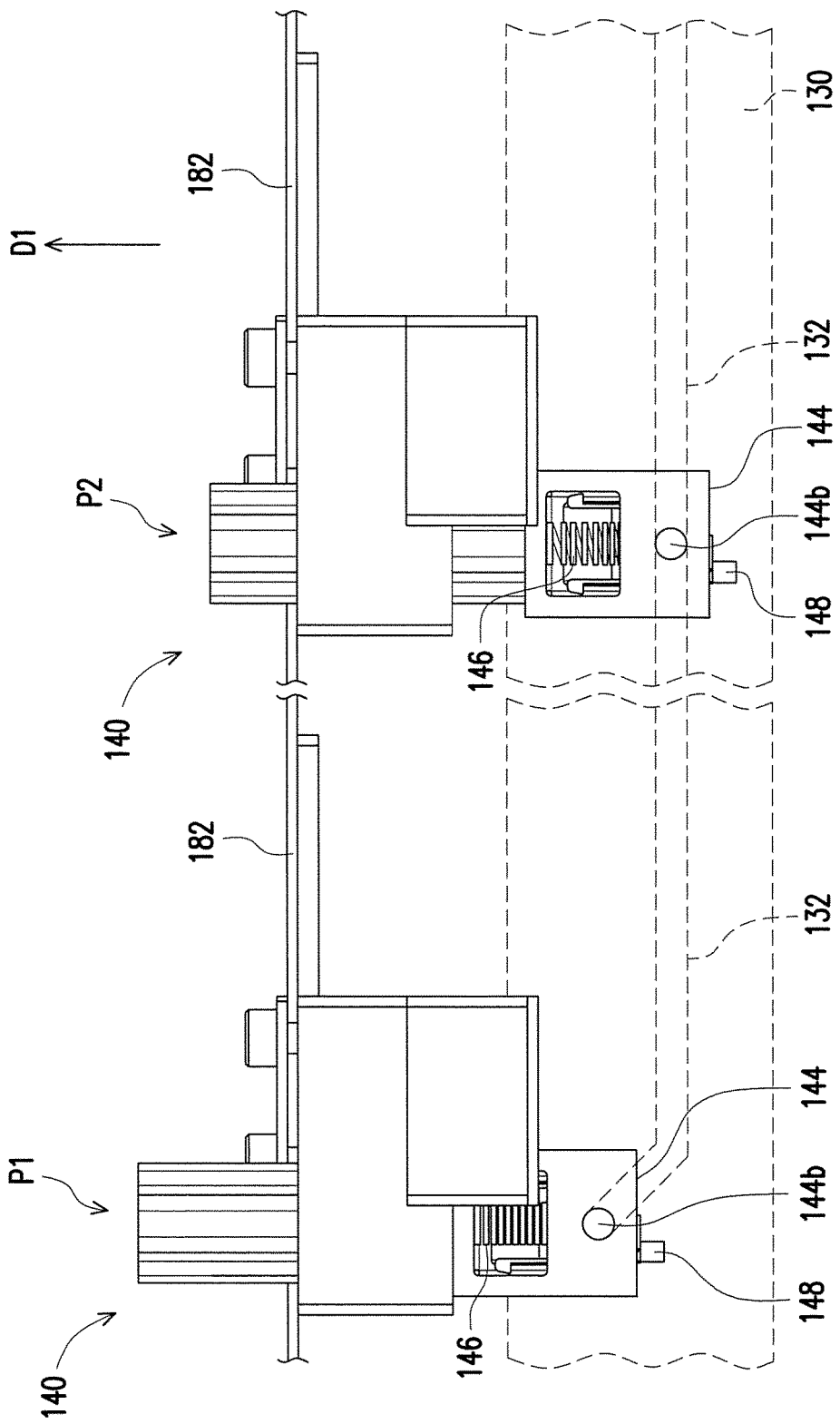
FIG. 4 is a schematic diagram of the sweeping tool moving from the position P2 to a position P1.

FIG. 2 is an enlarged view of the sweeping tool in the 3D printing apparatus of FIG. 1A, FIG. 1B and FIG. 1E. FIG. 3 is an exploded view of the sweeping tool in the 3D printing apparatus of FIG. 1A, FIG. 1B and FIG. 1E. FIG. 4 is a schematic diagram of the sweeping tool moving from the position P2 to the position P1.

Referring to FIG. 2 and FIG. 3, besides the fixing portion 141, the first moving member 142 and the second moving member 144, the sweeping tool 140 further includes a moving base 143, an elastic member 146 and a paddle 148. The second moving member 144 further has a convex post 144*b*. To be specific, the fixing portion 141 includes a plurality of locking members 141*a* and a locking plate 141*b*. The locking members 141*a* are, for example, screws or other elements having a locking function, which is not limited by the invention. The first moving member 142 has a first opening O1, a second opening O2 and a plurality of through holes H. The locking members 141*a* penetrate through the locking plate 141*b*, and are correspondingly disposed in the through holes H. The elastic member 146 leans between the second moving member 144 and the moving base 143. Referring to FIG. 4, in the present embodiment, the first collection tank 130 further has a slot hole 132. The convex post 144*b* is disposed in the slot hole 132, and is adapted to move along an extending direction of the slot hole 132. When the sweeping tool 140 is driven by the transmission assembly 180, the second moving member 144 is moved in the first collection tank 130 through the convex post 144*b* along the extending direction of the slot hole 132. In this way, due to configuration of the elastic member 146, a movable direction D1 of the second moving member 144 relative to the first moving member 142 is perpendicular to a bottom surface (not shown) of the first collection tank 130. Namely, the moving base 143 floats relative to the second moving member 144 through the elastic member 146, such that the paddle 148 leans against the first collection tank 130, and is adapted to a surface contour of the bottom surface (not shown) of the first collection tank 130, so as to decrease a chance of damaging the sweeping tool 140 due to protrusion of the bottom surface of the first collection tank 130.

Figure 5:
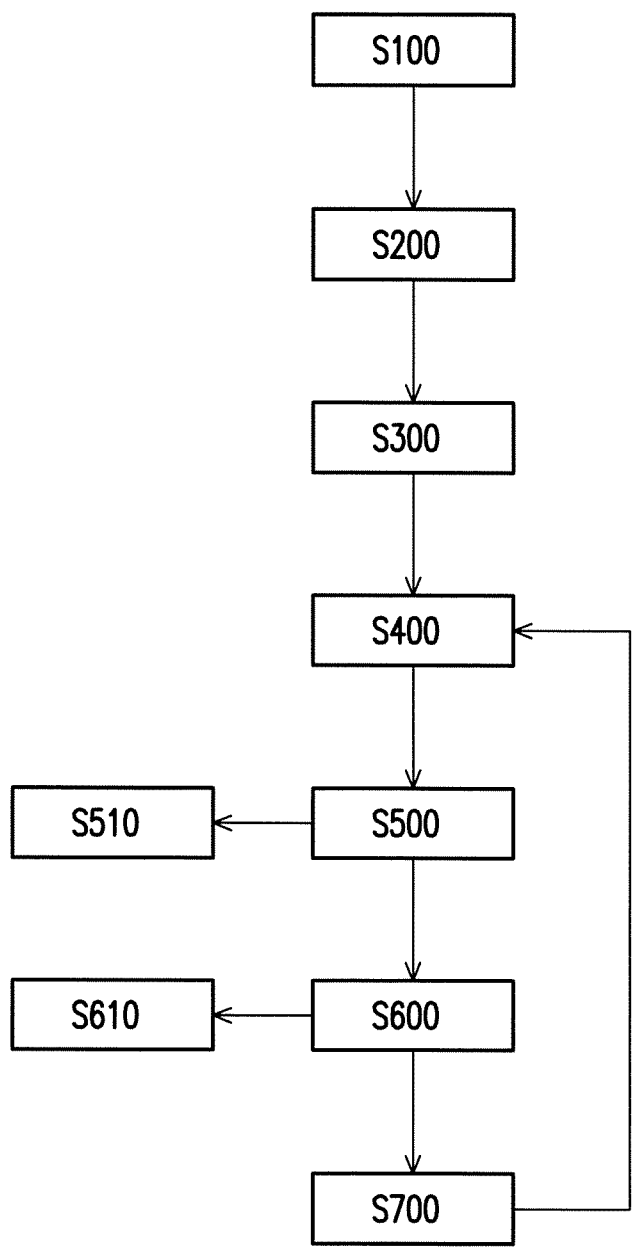
FIG. 5 is a diagram illustrating steps of the forming process of the 3D printing apparatus in FIG. 1A to FIG. 1E.

FIG. 5 is a diagram illustrating steps of the forming process of the 3D printing apparatus in FIG. 1A to FIG. 1E.

The following paragraph is used for describing the forming process of the 3D printing apparatus in FIG. 1A to FIG. 1E. Referring to FIG. 1A and FIG. 5, in the step S100, the 3D printing apparatus 100 cyclically heats the forming material 50 in the spray nozzle (not shown), and the control unit 160 controls the spray nozzle (not shown) to spray the forming material 50 on the forming platform 116 according to the forming information.

Referring to FIG. 1B and FIG. 5, in the step S200, the control unit 160 in the 3D printing apparatus 100 controls the roller 118 to rotate, and drives the forming platform 116 to move towards the roller 118, such that the roller 118 flattens the forming material 50 on the forming platform 116. When the forming material 50 is flattened, the control unit 140 controls the curing tool 114 to send the ultraviolet light to cure the forming material 50 into the solid layer SL.

Referring to FIG. 1B and FIG. 5, in the present embodiment, the 3D printing apparatus 100 further includes a first sensing unit SU1 and a second sensing unit SU2. The first sensing unit SU1 is located adjacent to the position P1 of the first collection tank 130, and the second sensing unit SU2 is located adjacent to the position P2 of the first collection tank 130. In the step S300, an initial position of the sweeping tool 140 is located at the position P2 of the first collection tank 130, and the sweeping tool 140 stops at the position P2.

Referring to FIG. 1E and FIG. 5, in the step S400, after the forming material 50 is guided into the first collection tank 130 along a surface of the scraping tool 120, the motor 190 rotates forward to drive the sweeping tool 140 to move along the sweeping path SP. Moreover, the first sensing unit SU1 located at the position P1 of the first collection tank 130 determines whether the sweeping tool 140 successfully reaches the position P1 of the first collection tank 130. To be specific, if the first sensing unit SU1 is triggered within a first predetermined time interval (for example, 10 seconds), the first sensing unit SU1 determines that the sweeping tool 140 successfully reaches the position P1 of the first collection tank 130. The sweeping tool 140 moves along the sweeping path SP (from the position P2 to the position P1) to sweep the forming material 50 in the first collection tank 130, and collects the forming material 50 in the first collection tank 130 to the second collection tank 150. Then, in the step S510, if the first sensing unit SU1 is not triggered within the first predetermined time interval, the operation of the sweeping tool 140 is stopped. The reason thereof is that if the first sensing unit SU1 is not triggered within the first predetermined time interval, the sweeping tool 140 probably falls out step due to impact of a foreign matter during a moving process thereof or due to that the resistance is greater than the maximum torque produced by the motor 190, or the first sensing unit SU1 is not triggered within the first predetermined time interval due to other reasons, so that through the step S510, damage of the 3D printing apparatus 100 due to the aforementioned probable problems is avoided.

Referring to FIG. 1E and FIG. 5, in the step S500, after the sweeping tool 140 successfully reaches the position P1 of the first collection tank 130, the motor 190 stops running within a second predetermined time interval (for example, 3 seconds).

Referring to FIG. 1B and FIG. 5, in the step S600, the motor 190 rotates backward to drive the sweeping tool 140 to move along the sweeping path SP (from the position P1 to the position P2). Moreover, the second sensing unit SU2 located at the position P2 of the first collection tank 130 determines whether the sweeping tool 140 successfully reaches the position P2 of the first collection tank 130. To be specific, if the second sensing unit SU2 is triggered within a third predetermined time interval (for example, 20 seconds), the second sensing unit SU2 determines that the sweeping tool 140 successfully reaches the position P2 of the first collection tank 130. Then, in the step S610, if the second sensing unit SU2 is not triggered within the third predetermined time interval, the operation of the sweeping tool 140 is stopped. The reason thereof is that if the second sensing unit SU2 is not triggered within the third predetermined time interval, the sweeping tool 140 probably falls out step due to impact of a foreign matter during the moving process thereof or due to that the resistance is greater than the maximum torque produced by the motor 190, or the second sensing unit SU2 is not triggered within the third predetermined time interval due to other reasons, so that through the step S610, damage of the 3D printing apparatus 100 due to the aforementioned probable problems is avoided.

Referring to FIG. 1B and FIG. 5, in the step S700, after the sweeping tool 140 successfully reaches the position P2 of the first collection tank 130, the motor 190 stops running within a fourth predetermined time interval (for example, 10 seconds). Moreover, the flow returns to the step S400 to perform a next sweeping operation.

In summary, in the 3D printing apparatus according to the embodiment of the invention, based on the configuration of the sweeping tool, the scraping tool, the first collection tank and the second collection tank, during the forming process, the forming material on the surface of the roller is scraped by the scraping tool and is guided to the first collection tank, and the sweeping tool is configured to sweep the forming material in the first collection tank to a position of the first collection tank, and the second collection tank receives the forming material swept to the position by the sweeping tool.

Therefore, the 3D printing apparatus of the invention is capable of conveniently clean the forming material. Moreover, a chance that the forming material is piled up between the roller and the scraping tool is greatly decreased, so as to maintain the effect that the roller flattens the forming material on the forming platform, and the 3D printing apparatus of the invention has good printing quality.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional printing apparatus, comprising:
    a forming assembly, having a roller, and configured to produce and stack a forming material to form a three-dimensional object during a forming process, wherein a surface of the roller is adhered with the forming material during the forming process;
    a scraping tool, disposed beside the roller, and attached to the surface of the roller, wherein when the roller is rotated, the scraping tool removes the forming material adhered on the surface of the roller;
    a first collection tank, disposed beside the scraping tool and located opposite to the roller, such that the scraping tool leans between the first collection tank and the roller, and the forming material removed from the surface of the roller is guided into the first collection tank by the scraping tool;
    a sweeping tool, movably leaned against the first collection tank to sweep the forming material in the first collection tank to a position of the first collection tank; and
    a second collection tank, connected to the position of the first collection tank to receive the forming material swept to the position by the sweeping tool.

2. The three-dimensional printing apparatus as claimed in claim 1, wherein the roller is rotated with a rotation shaft, and the sweeping tool moves along a sweeping path to sweep the forming material in the first collection tank, wherein the sweeping path is parallel to the rotation shaft.

3. The three-dimensional printing apparatus as claimed in claim 2, further comprising:
    a first guide post, the sweeping tool movably disposed on the first guide post, and an extending direction of the first guide post is parallel to the sweeping path;
    a transmission assembly, connected to the sweeping tool; and
    a motor, connected to the transmission assembly, and driving the transmission assembly to drive the sweeping tool to move along the sweeping path.

4. The three-dimensional printing apparatus as claimed in claim 3, wherein the sweeping tool further comprises:
    a first moving member, movably disposed on the first guide post and connected to the transmission assembly;
    a second moving member, movably disposed on the first moving member and connected to the transmission assembly;
    a moving base, disposed in the second moving member;
    an elastic member, retractably leaned between the moving base and the second moving member; and
    a paddle, disposed on the moving base, wherein the moving base floats relative to the second moving member through the elastic member, such that the paddle leans against the first collection tank and is adapted to a surface contour of a bottom surface of the first collection tank.

5. The three-dimensional printing apparatus as claimed in claim 4, wherein a movable direction of the second moving member relative to the first moving member is perpendicular to the bottom surface of the first collection tank.

6. The three-dimensional printing apparatus as claimed in claim 5, wherein the first moving member has a first opening and a second opening, the first guide post penetrates through the first opening, the second moving member has a second guide post, and the second guide post penetrates through the second opening along the movable direction.

7. The three-dimensional printing apparatus as claimed in claim 4, wherein the first collection tank has a slot hole, the second moving member further comprises a convex post, the convex post is disposed in the slot hole, and is adapted to move along an extending direction of the slot hole, and when the sweeping tool is driven by the transmission assembly, the second moving member is moved in the first collection tank through the convex post along the extending direction of the slot hole.

8. A three-dimensional printing apparatus, comprising:
    a forming assembly, having a roller, and configured to produce and stack a forming material to form a three-dimensional object during a forming process, wherein a surface of the roller is adhered with the forming material during the forming process; and
    a scraping tool;
    a sweeping tool; and
    at least one collection tank, wherein the scraping tool leans between the surface of the roller and the collection tank, so as to scrap the forming material adhered to the surface of the roller when the roller is rotated, wherein both of the scraping tool and the roller extend along an axial direction, and the sweeping tool leans against the scraping tool and moves along the axial direction, so as to sweep the forming material on the scraping tool to the collection tank.

9. The three-dimensional printing apparatus as claimed in claim 8, wherein the at least one collection tank comprises a first collection tank disposed beside the scraping tool and located opposite to the roller, such that the scraping tool leans between the first collection tank and the roller, and at least a part of the forming material on the scraping tool is guided into the first collection tank.

10. The three-dimensional printing apparatus as claimed in claim 9, further comprising a second collection tank, wherein the first collection tank extends along the axial direction, the second collection tank is disposed at one end of the first collection tank along the axial direction, the second collection tank is connected to the first collection tank, and the sweeping tool leans against both of the scraping tool and the first collection tank to sweep the forming material into the second collection tank.

11. The three-dimensional printing apparatus as claimed in claim 9, wherein the roller is rotated with a rotation shaft, and the sweeping tool moves along a sweeping path to sweep the forming material in the first collection tank, wherein the sweeping path is parallel to the rotation shaft and the axial direction.

12. The three-dimensional printing apparatus as claimed in claim 11, further comprising:
    a first guide post, the sweeping tool movably disposed on the first guide post, and an extending direction of the first guide post is parallel to the sweeping path;

a transmission assembly, connected to the sweeping tool; and a motor, connected to the transmission assembly, and driving the transmission assembly to drive the sweeping tool to move along the sweeping path.

13. The three-dimensional printing apparatus as claimed in claim 12, wherein the sweeping tool further comprises:
a first moving member, movably disposed on the first guide post and connected to the transmission assembly;
a second moving member, movably disposed on the first moving member and connected to the transmission assembly;
a moving base, disposed in the second moving member;
an elastic member, retractably leaned between the moving base and the second moving member; and
a paddle, disposed on the moving base, wherein the moving base floats relative to the second moving member through the elastic member, such that the paddle leans against the first collection tank and is adapted to a surface contour of a bottom surface of the first collection tank.

14. The three-dimensional printing apparatus as claimed in claim 13, wherein a movable direction of the second moving member relative to the first moving member is perpendicular to the bottom surface of the first collection tank.

15. The three-dimensional printing apparatus as claimed in claim 14, wherein the first moving member has a first opening and a second opening, the first guide post penetrates through the first opening, the second moving member has a second guide post, and the second guide post penetrates through the second opening along the movable direction.

16. The three-dimensional printing apparatus as claimed in claim 13, wherein the first collection tank has a slot hole, the second moving member further comprises a convex post, the convex post is disposed in the slot hole, and is adapted to move along an extending direction of the slot hole, and when the sweeping tool is driven by the transmission assembly, the second moving member is moved in the first collection tank through the convex post along the extending direction of the slot hole.

* * * * *